United States Patent
Zimmerman et al.

[15] 3,678,016
[45] July 18, 1972

[54] FABRICATION OF SHAPED ARTICLES CROSS-LINKED BY CHEMICAL ADDITION REACTIONS

[72] Inventors: Robert L. Zimmerman; Kent S. Dennis; Eugene R. Moore, all of Midland, Mich.

[73] Assignee: The Dow Chemical Company, Midland, Mich.

[22] Filed: Feb. 27, 1967

[21] Appl. No.: 618,998

Related U.S. Application Data

[63] Continuation-in-part of Ser. No. 342,812, Feb. 5, 1964, abandoned.

[52] U.S. Cl. ..................260/78.4 D, 260/2.3, 260/78.5 T, 260/80.3 N, 260/80.73, 260/80.75, 260/80.76, 260/80.8, 260/80.81, 260/85.7, 260/86.1 R, 260/86.1 N, 260/86.7, 264/239, 260/881
[51] Int. Cl. .........................................................C08f 27/00
[58] Field of Search..................260/78.5, 78.5 T, 78.5 HC, 260/2.3, 78.4 D, 80.3 N, 86.7, 88.1, 85.7, 80.73, 80.75, 80.76, 80.8, 80.81

[56] References Cited

UNITED STATES PATENTS 3,085,986 4/1963 Muskat......................260/78.5 HC X
3,299,184 1/1967 Whitworth et al..........260/78.5 B UX
2,729,618 1/1956 Muller et al. ...........................260/2.3
3,408,337 10/1968 Moore..................................260/78.5
3,336,267 8/1967 Zimmerman et al..................260/78.5

*Primary Examiner*—Joseph L. Schofer
*Assistant Examiner*—John Kight, III
*Attorney*—Griswold & Burdick and Albin R. Lindstrom

[57] ABSTRACT

"Cross-linking of a reactive polymer and a curing agent which occurs by a chemical addition reaction has been found to be reversible at elevated temperatures. The reversible nature of the cross-linking reaction makes it possible to prepare more uniformly crosslinked articles by separately heating a polymer such as styrene-maleic anhydride and a polyol, combining them at elevated temperatures and then by cooling form uniform cross-links. Another feature of the invention provides for heating a cross-linked article to reverse the cross-links, fluidize the composition, reform it and then cool to recross-link the composition. Useful coreactive functional groups include a polymer with a hydroxyl group and a curing agent with anhydride groups or a polymer with carboxylic acid groups and a curing agent with vinyl ether groups.

10 Claims, No Drawings 3,678,016

FABRICATION OF SHAPED ARTICLES CROSS-LINKED BY CHEMICAL ADDITION REACTIONS

This is a continuation-in-part of our prior application Ser. No. 342,812, filed Feb. 5, 1964 now abandoned.

This invention relates to methods for heat fabricating shaped articles from compositions which cross-link by chemical addition reactions and is more particularly related to methods whereby plastic materials can be heat fabricated in an essentially thermoplastic condition at elevated temperatures due to reversal of a chemical addition reaction, but which, upon cooling, set to a chemically cross-linked composition.

Many thermosetting compositions are liquid resins where it is possible to obtain complete mixing of the curing agents with the resin before the application of heat to accelerate the cure. However, other compositions are not liquid and it is more difficult to obtain thorough distribution of the curing agent because it is necessary to heat the composition to fluidize it, and cross-linking begins to take place without an induction period as soon as the components begin to flow together and before the curing agent is uniformly mixed. Incompleteness of cross-linking is a problem especially with a system such as a copolymer of an unsaturated dibasic acid anhydride and a curing agent such as a polyhydric alcohol.

This invention relates to the novel finding that certain cross-linking addition reactions are reversible reversible elevated temperatures so that the polymer-curing agent compositions can be maintained as fluid compositions at these elevated temperatures long enough to be fabricated into shaped articles, and the fabricated articles can then be set by cooling. This invention further provides for the refabrication of articles from scrap, reject articles and the like whereby upon heating, certain cross-linked compositions become fluid again due to reversal of the cross-linking action.

The invention requires (A) a polymeric material with functional groups, X, reactive by simple addition reaction with (B) a polyfunctional curing reagent having functional groups, Y.

$$X + Y = XY$$

It is to be noted that the reaction is one of addition and no small molecule is eliminated as is commonly found with condensation reactions such as the esterification reaction between an alcohol and a carboxylic acid. The equilibrium reaction must favor the product, XY, at temperatures from room temperature up to about 100°–120° C. Above about 150° up to about 300° C., the equilibrium must favor X and Y essentially unreacted and, therefore, A essentially uncross-linked by B. Side reactions must be at a minimum to prevent loss of the reversible reaction. Rates of the forward and reverse reactions must be fast enough to achieve the effect of cross-linking or uncross-linking in practical times. For example, the forward reaction at 100° C. should be substantial in one week. At 250° C., the reverse reaction should not require more than about one hour.

Fabrication methods include (a) a process for heat fabrication of a mixture of A and B at a temperature such that the mixture is essentially uncross-linked and cooling to a temperature at which cross-linking occurs, and (b) a process for heating the cross-linked product of A—B to uncross-link it. The fabrication methods under (a) would include injection molding, extrusion, thermoforming and transfer molding. For low viscosity melts, procedures such as casting, dipping and spraying would be feasible. Compression molding would be operable, but is not preferred because the die temperature would have to be cycled to take advantage of the thermoplastic-thermosetting nature of the reactants.

Several variations of process (a), above, are within the scope of this invention. The components A and B may be heated separately before mixing, and this method is particularly advantageous when the cross-linking agent contains secondary amine groups; the components may be heated, either separately or in admixture, and sprayed onto a warm or hot object which is then cooled; and one surface may be coated with component A and a second surface with component B followed by pressing the two coated surfaces together and heating followed by cooling. Other variations will be apparent to those skilled in the art.

Polymer A is a polymeric material, preferably of molecular weight greater than 1,500, having at least two and generally more than two functional groups, X, per molecule which are the only reactive functional groups. The functional group, X, may be a five- or six-membered cyclic anhydride, a carboxylic acid, a primary or secondary hydroxyl or a secondary amine having the formula —NHR where R is an alkyl radical or an aromatic radical such as a phenyl or substituted phenyl radical wherein the substituent is not coreactive. Polymer A may be a vinyl addition polymer comprising from about 1 to about 40 mole percent of a vinyl monomer containing the above-identified functional groups and the balance to make 100 percent of one or more copolymerizable monomers.

Suitable vinyl monomers containing the functional group include unsaturated dicarboxylic acid anhydrides such as maleic, citraconic, aconitic, halogenated maleic, phenyl maleic or itaconic anhydrides and the like; unsaturated monocarboxylic acids such as acrylic, methacrylic, cinnamic acids and the like; and allyl alcohol, vinyl benzyl alcohol, hydroxyalkyl acrylates or methacrylates, N-(t-butyl) aminoethyl acrylate, maleic acid half esters and the like. Suitable copolymerizable monomers include vinyl aromatic monomers, alkyl esters of acrylic or methacrylic acid, vinyl esters, α-olefins, isobutylene and the like. The functional group, X, may be introduced by modification of a vinyl polymer.

Polymer A is preferably a homogeneous copolymer of a monovinyl aromatic monomer, e.g., styrene, vinyltoluene, α-methylstyrene, the chlorostyrenes and the like, and an α,β-unsaturated dicaroboxylic cyclic anhydride, e.g., maleic, citraconic, aconitic, phenylmaleic, itaconic or chloromaleic anhydrides. Such copolymers advantageously contain from 1 to 40 mole percent of anhydride and from 99 to 60 mole percent of the vinyl aromatic monomer. Preferably, the copolymer contains from about 5 to about 25 mole percent of anhydride and from 95 to 75 mole percent of the vinyl aromatic monomer.

Curing agent B is a low molecular weight compound, preferably of molecular weight less than 1,500, having more than one, and preferably two, functional groups, Y, per molecule. The functional group, Y, may be primary hydroxyl, secondary hydroxyl, —NHR where R is an alkyl or an aromatic radical, $CH_2 = CHO—$ or a five- or six-membered cyclic anhydride, and is selected to be coreactive with the functional group of the polymer. Hereinafter, coreactive is defined to be the group, Y, reactive by chemical addition with the group, X.

Coreactive pairs of functional groups include:
anhydride/hydroxyl
anhydride/secondary amine
carboxylic acid/$CH_2 = CHO—$ Preferably, the anhydride or carboxylic acid functionality is present in the polymer A.

Suitable curing agents include mono- and polyalkylene oxide polyols, $C_3$ and higher diols, RNHR'NHR" where R' is a bivalent organic radical and R and R" are alkyl, aromatic or may be joined together to form a cyclic compound, divinyl ether of diethylene glycol, dimethylol diphenyloxide and the like. The curing agent is preferably an alkylene or polyalkylene glycol.

Particularly advantageous is the system:

A = styrene-maleic anhydride copolymer containing up to about 15 mole percent maleic anhydride (or about 0.15 equiv. anhydride/100 g.) and having a solution viscosity (10 percent in MEK) in the range of 0.5 to 20 cps.;

B = a diol such as butanediol, triethylene glycol, diethylene glycol and ethylene glycol. The diols are advantageously used on a basis of 1 OH per anhydride. A range of operability of one-fifth to 1½ OH per free anhydride is preferred.

Catalysts such as strong mineral and organic acids have been effective in promoting the rate of reaction and have no hindering side effects. Other catalysts such as tertiary amines and quaternary ammonium compounds are also effective.

Non-reactive fillers and pigments, particularly glass fibers, may be added to the compositions of the invention. Non-reactive plasticizers, and to a limited extent, reactive plasticizers, may also be employed. In this connection, the invention provides an advance in the art of plasticizing polystyrenes. Polystyrene, when plasticized, normally undergoes unrecoverable creep. The cross-linking reaction of the invention makes it possible for the product to recover to its original dimensions without appreciable permanent set.

When a reactive monofunctional plasticizer or additive is employed, the amount used must be limited so that the cross-linking reactivity is not lost. Addition of such monofunctional reagents permits fine control of the cross-linking mechanism.

While this invention relates primarily to cross-linked polymers in the customarily accepted sense, it will be appreciated by those skilled in the art that if polymer A contains exactly two functional groups, X, and curing agent B contains exactly two functional groups, Y, the reaction $$X + Y \rightarrow XY$$

cannot yield a cross-linked product, but would result in a linked polymer of increased molecular weight. In a broad sense, therefore, the invention applies to such linking reactions, but is particularly advantageous where the gel point of an infinite network is achieved and the polymeric products show the advantageous properties associated with thermoset resins.

While other explanations may be advanced, it is believed that the several embodiments of this invention are best explained in the equilibrium relationships of the addition cross-linking reaction. Of importance are the factors that a finite time is required to establish the equilibrium and that the cross-linking reaction evolves heat. The latter factor means that as the temperature is raised, the equilibrium favors an uncross-linked state and as the temperature is lowered, the equilibrium favors a cross-linked state.

A particularly advantageous embodiment of this invention utilizing this equilibrium involves separately preheating the polymer component and the curing agent component to a temperature ranging from about 200° to about 300° C., mixing the components so as to provide about one-tenth to about 1½ functional groups of the curing agent per functional group of the polymer and cooling. Even in the case of the curing agent containing secondary amine groups, where the equilibrium at this temperature range sufficiently favors the cross-linking reaction to obtain gelation, the rate of attainment of the equilibrium is such that mixing of the hot fluid components can be obtained before gelation occurs. When the curing agent functional group is $CH_2 = CHO-$ or a primary or secondary hydroxyl group, the cross-linking reaction is sufficiently suppressed at these temperatures that the mixture can be maintained in a fluid condition and cooling is required to obtain cross-linking. Such a method is especially adaptable to high speed fabrication of plastic articles.

Another embodiment of this invention involves heating the polymer component and the curing agent component either separately and then combining as above, or in admixture to a fluid state and then cooling. When the coreactive functional groups are anhydride/hydroxyl or carboxylic acid/$CH_2 = CHO-$, the equilibrium is such that at a temperature range of from about 175° to about 300° C., the mixture remains fluid without gelation. It is preferred that the functional group in the polymer comprises from about 5 to about 25 mole percent and the proportions of curing agent comprise from about one-tenth to about 1 functional group per functional group in the polymer. Advantageously, this embodiment allows the reheating of a fabricated article, scrap, reject articles, etc. to a fluid state and refabrication.

The invention is further illustrated by the following examples. The abbreviation MA refers to maleic anhydride.

EXAMPLE 1

A sample of a homogeneous styrene/maleic anhydride copolymer containing 10.6 percent MA and having a viscosity characteristic of 5.4 cps. (the absolute viscosity of a 10 percent solution in methyl ethyl ketone at 25° C.) was ground and mixed with 6 phr. of 1,4-butanediol. This mix was fed into the cylinder of a 10 g. injection molding machine with a cylinder that held about 50 g. of material at a cylinder temperature of 260° C. Moldings were made and tested for cross-linking by solubilization in methyl ethyl ketone (MEK). The samples were fully soluble. A molded piece heated at 120° C. for 15 hours did not distort appreciably and was uniformly insoluble in MEK, swelling to about twice the original size.

From 260° C., the cylinder temperature was lowered to 246°, 232°, 218°, 204°, and 190° C. Moldings tested in MEK showed increasing gel content as the cylinder temperature decreased. At 177° C., the material could not be molded due to a very high gel content. The cylinder temperature was then increased stepwise to 204°, 232° and 260° C. and one molding was made at each temperature. With increasing cylinder temperature, the gel content decreased until at 260° C., the molding was soluble in MEK.

A styrene/maleic anhydride copolymer containing 3.78 percent MA (11.8 cps.) mixed with 1.7 phr. butanediol gave excellent moldings at 204° C. with a low gel content. A molded piece heated at 120° C. for 15 hours shrank somewhat but was uniformly cross-linked to insolubility in MEK. The piece swelled about three to four times in MEK.

EXAMPLE 2

A 200 g. sample of a styrene/maleic anhydride copolymer containing 10.65 percent MA (6.37 cps.) was milled for about 15 minutes on steel rolls at about 150° C. with 9 g. butanediol added. The product was insoluble in MEK. After grinding, it was injection molded. At 260° C. cylinder temperature, the moldings were highly gelled. At 266°–282° C. top-bottom cylinder temperatures, the moldings were lower in gel content and had better surface gloss. At 271°–294° and 277°–302° C., the moldings were quite good and still lower in gel content. Going up to 282°–310' and 294°–313° C., the moldings were more yellow colored, had some bubbles and the MEK test indicated very little gel.

It was observed that even at these high molding temperatures, the material set up in the die much faster than polystyrene.

EXAMPLE 3

A sample of a styrene/maleic anhydride copolymer containing 10.2 percent MA (1.42 cps.) was dissolved in MEK at about 50 percent solids and 7 phr. butanediol added. Woven glass cloth with a Volan A finish was impregnated with this solution and air dried. A 12-ply laminate was compression pressed at 175° C. for 30 minutes yielding a thermoset ⅛-inch sheet of about 35 percent resin, 65 percent glass. This sheet was heated in 300° C. oven for 4 minutes to reverse the cross-linking, removed and pressed in a cold die to form a dish. The dish was painted with a xylene-based primer coating and baked at 105° C. for 90 minutes to cure the coating and recross-link the resin. The primer solvent did not craze or attack the resin binder in the dish and in the final product, both resin and coating were cured.

EXAMPLE 4

A mixture of 431 g. of finely ground styrene-maleic anhydride resin containing 7.11 percent MA (7.44 cps.) and 175 g. dioctyl phthalate (DOP) was mixed in a Baker Perkins sigma blade mixer at 125° C. and 14 g. of butanediol was added. After mixing 10 minutes, the gum-like mixture was removed and cooled. It was somewhat opaque and insoluble in MEK. A sample was cured in a compression press at 177° C.

for 30 minutes to yield a tough, flexible 1/16-inch thick sheet of good clarity. Dumbell specimens 1 × ¼ inch in the narrow section were cut from the sheet and reference marks 1 inch apart were stamped on. A specimen was tested in an Instron tester at a crosshead speed of 0.05 in./min. The stress climbed to about 410 psi. and varied ± 50 psi. while the sample elongated about 100 percent. Then, the stress cycled up to about 500 psi. and at 200 percent elongation, the sample broke. The elapsed time was about 32 minutes. The two pieces were put in an oven at 60° C. to hasten recovery of the strain. In 2 minutes, the pieces fit together measured exactly 1 inch between the scribes.

A sample of the cured sheet heated at 260° C. for 30 minutes was pourable and after quenching, was soluble in MEK. The same styrene/maleic anhydride resin, 370 g., was mixed with 230 g. DOP and 11 g. butanediol, cured and tested as above. Tensile strength: 240 psi.; elongation: 250 percent. This sample had good recovery at room temperature, exhibiting about 4 percent permanent set after 1 hour. To 100 g. of the initial mix was added 40 g. lampblack on steel rolls at room temperature. This product was cured at 177° C. for 30 minutes in a sheet and tested. Tensile strength: 500 psi.; elongation: 130 percent.

The starting styrene/maleic anhydride resin had a tensile strength of about 6,400 psi. and elongation of about 3.0 percent.

EXAMPLE 5

Fifty grams of a styrene/maleic anhydride resin containing 11.2 percent MA (1.66 cps.) was mixed with 30 g. DOP and 7 g. hexadecyl alcohol at 200° C. There was added 0.9 g. ethylene glycol and heating continued at 200° C. No gelation occurred in about an hour; however, on cooling the sample to room temperature, it gelled due to cross-linking. Four days later, on reheating at 200° C., in 1 hour the sample was fluid. It did not gel at 175° C. in an hour, but at 135° C., it gelled in 15-30 minutes. Returned to 175° C., it became fluid and remained fluid overnight.

EXAMPLE 6

A copolymer of 98 percent styrene and 2 percent acrylic acid having a viscosity characteristic of 1.24 cps. (10 percent in MEK), 25 g. and 15 g. of Dow 276-V2 poly-α-methylstyrene liquid plasticizer were admixed and heated to 225° C. to melt the resin. Divinyl ether of diethylene glycol, 0.35 g., was added and rapidly mixed. The entire mass quickly gelled. On heating at 225° C. for 20 minutes, the gel uncross-linked and fluidized. Heating at 140° C. caused recross-linking to occur within about 1 hour.

EXAMPLE 7

A copolymer of styrene/MA (100 g.) containing 10 percent MA and having a viscosity of 1.12 cps. (10 percent in MEK) was heated to 250° C. under nitrogen in a mixer until it was fluid. Then, 5 grams of piperazine hydrate were added slowly, mixed and then extruded into cold water. Samples of the extruded material were placed in bottles of MEK and rocked slowly overnight. By decanting and drying the residue, it was determined that 58.6 percent was insoluble in MEK. Other samples were first heated at 136° C. for 1 hour before placing in MEK. An average of 78.1 percent was insoluble for these samples.

EXAMPLE 8

A copolymer of styrene and hydroxyethyl methacrylate was made as follows: A solution of 205 g. styrene and 205 g. MEK was placed in a round bottom flask equipped with a stirrer, condenser and burette. The burette contained 45 g. hydroxyethyl methacrylate, 45 g. MEK and 4.1 g. benzoyl peroxide. This solution was fed incrementally into the flask which was maintained at reflux temperature (about 90° C.). The flask was kept under a nitrogen atmosphere. After 24 hours, another 1.0 g. benzoyl peroxide was added to the flask and its contents were stirred at reflux for about 72 hours more. Conversion was 98 percent. The polymer solution was devolatilized under vacuum.

One hundred g. of this polymer were melted at 250° C. in a mixer under nitrogen. Then, 1.5 g. pyromellitic anhydride (0.1 anhydride per hydroxyl) were added. After a few minutes, the mixture began to thicken and was extruded into cold water. Samples were taken and soaked in MEK overnight and the MEK was then decanted. The weights of the dry residues showed that the material was 63 percent insoluble in MEK.

EXAMPLE 9

In a manner similar to that of Example 8, a copolymer was prepared containing 16.5 percent by weight of N-(t-butyl) aminoethyl methacrylate and the balance styrene. 100 grams of this copolymer were melted under nitrogen at 250° C. in a mixer. Then, 9 grams of pyromellitic anhydride were added (about one anhydride group/amine group), mixed well and extruded. The extruded product was 33 percent insoluble in MEK.

EXAMPLE 10

To 100 grams of a styrene-MA copolymer, containing 10 percent MA, melted under nitrogen at 250° C. in a mixer were added 4.4 grams of N,N'-dimethyl-ethylenediamine (about one amine group/anhydride group). After mixing, the mixture was extruded. The product was 10 percent insoluble in MEK.

Various modifications may be made in this invention without departing from the spirit or scope thereof and it is understood that we limit ourselves only as defined in the appended claims.

What is claimed is:

1. A process for forming shaped articles which comprises:
   A. separately heating to a temperature of about 200° to about 300° C.
      1. a vinyl addition polymer comprising from 1 to 40 mole percent of a monomer containing a functional group wherein the functional group is a cyclic anhydride derived from an α,β-unsaturated dicarboxylic acid anhydride, a carboxylic acid, —NHR where R is an alkyl or aromatic radical, primary hydroxyl or secondary hydroxyl and the balance, to make 100 percent, of at least one copolymerizable monomer selected from the group consisting of vinyl aromatic monomers, alkyl esters of acrylic and methacrylic acid, vinyl esters, α-olefins and isobutylene;
      2. a curing agent having more than one functional group wherein the functional group is primary or secondary hydroxyl, —NHR where R is an alkyl or aromatic radical, a five- or six-membered cyclic anhydride or $CH_2 = CHO—$, and wherein the functional group is selected to be coreactive by chemical addition with the functional group of the polymer;
   B. combining the curing agent with the polymer at the desired elevated temperature in such proportions so as to provide a composition containing from one-tenth to 1½ functional groups of curing agent per functional group of polymer,
   C. forming the article, and
   D. cooling to set the composition.

2. The process of claim 1 wherein the vinyl addition polymer is a copolymer of a vinyl aromatic monomer and a α,β-unsaturated dicarboxylic acid anhydride monomer.

3. The process of claim 2 wherein the vinyl addition polymer is a copolymer of maleic anhydride and styrene.

4. The process of claim 1 wherein the vinyl addition polymer is a copolymer of styrene and acrylic or methacrylic acid and the curing agent is a divinyl ether of diethylene glycol.

5. The process of claim 1 wherein the vinyl addition polymer is a copolymer of styrene and hydroxy-ethyl methacrylate or of styrene and N-(t-butyl) amino-ethyl methacrylate.

6. The process of claim 1 wherein the curing agent is piperidine, N,N'-diisopropyl p-phenylenediamine or N,N'-dimethyl ethylenediamine.

7. The process of claim 1 wherein the curing agent is a glycol, a polyalkylene glycol or a dihydric alcohol containing three or more carbon atoms.

8. A process for forming shaped articles which comprises:
A. heating to a temperature of about 175° to about 300° C. a cross-linked composition comprising:
1. a vinyl addition polymer comprising from 1 to 40 mole percent of a monomer containing a functional group wherein the functional group is a a carboxylic acid, — NHR where R is an alkyl or aromatic radical, primary hydroxyl or secondary hydroxyl and the balance, to make 100 percent, of at least one copolymerizable monomer selected from the group consisting of vinyl aromatic monomers, alkyl esters of acrylic and methacrylic acid, vinyl esters, $\alpha$-olefins and isobutylene, cross-linked by
2. a curing agent having more than one functional group wherein the functional group is five- or six-membered cyclic anhydride or $CH_2 = CHO-$, and wherein the functional group is selected to be coreactive by chemical addition with the functional group of the polymer; said composition containing the curing agent in such proportions so as to provide from one-tenth to about 1 functional group per functional group of the polymer;
B. forming the article, and
C. cooling to set the article.

9. The process of claim 8 wherein the vinyl addition polymer is a copolymer of styrene and hydroxy-ethyl methacrylate.

10. The process of claim 8 wherein the vinyl addition polymer is a copolymer of styrene and acrylic or methacrylic acid and the curing agent is a divinyl ether of diethylene glycol.

* * * * *

PO-1050
(5/69)

UNITED STATES PATENT OFFICE
CERTIFICATE OF CORRECTION

Patent No. 3,678,016      Dated 12 March 1974

Inventor(s) Robert L. Zimmerman, Kent S. Dennis, Eugene R. Moore

It is certified that error appears in the above-identified patent and that said Letters Patent are hereby corrected as shown below:

Column 7, lines 16 and 17, delete [-NHR where R is an alkyl or aromatic radical,]

Signed and sealed this 16th day of July 1974.

(SEAL)
Attest:

McCOY M. GIBSON, JR.
Attesting Officer

C. MARSHALL DANN
Commissioner of Patents